United States Patent
Vusirikala et al.

(10) Patent No.: US 9,755,734 B1
(45) Date of Patent: Sep. 5, 2017

(54) SUBSEA OPTICAL COMMUNICATION NETWORK

(71) Applicant: Google Inc., Mountain View, CA (US)

(72) Inventors: Vijayanand Vusirikala, Palo Alto, CA (US); Valey Kamalov, Gainesville, FL (US); Bikash Koley, Sunnyvale, CA (US); Ralph Hofmeister, Lost Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/177,491

(22) Filed: Jun. 9, 2016

(51) Int. Cl.
  *H04B 10/038* (2013.01)
  *H04B 10/80* (2013.01)
  *H04L 12/24* (2006.01)
  *H04Q 11/00* (2006.01)

(52) U.S. Cl.
  CPC ......... *H04B 10/038* (2013.01); *H04B 10/808* (2013.01); *H04L 41/0668* (2013.01); *H04L 41/0686* (2013.01); *H04Q 11/0066* (2013.01); *H04Q 2011/0081* (2013.01); *H04Q 2213/05* (2013.01)

(58) Field of Classification Search
  CPC . H04B 10/038; H04B 10/808; H04L 41/0668; H04L 41/0686; H04Q 11/0066; H04Q 2011/0081; H04Q 2213/05
  USPC .......................................................... 398/5
  See application file for complete search history.

(56) References Cited

U.S. PATENT DOCUMENTS

| 5,526,157 | A | * | 6/1996 | Kawano | H04B 10/032 398/1 |
| 6,377,373 | B1 | * | 4/2002 | Kawazawa | H04B 10/27 398/82 |
| 2003/0072062 | A1 | * | 4/2003 | Pedersen | G02B 6/4428 398/181 |
| 2003/0151521 | A1 | * | 8/2003 | Horinouchi | H04B 10/806 340/850 |
| 2006/0251423 | A1 | * | 11/2006 | Evangelides | H04B 10/2935 398/105 |

(Continued)

FOREIGN PATENT DOCUMENTS

EP 2393221 A1 12/2011
WO WO-2015004000 A1 1/2015

*Primary Examiner* — Dalzid Singh
(74) *Attorney, Agent, or Firm* — Honigman Miller Schwartz and Cohn LLP

(57) ABSTRACT

A communication system includes a first and second trunk terminals, a plurality of communication trunks disposed along a floor of a body of water, and power feed equipment. Each communication trunk couples the first trunk terminal to the second trunk terminal and includes at least one signal amplifier configured to amplify a signal conveyed along the corresponding communication trunk. The power feed equipment is coupled to the plurality of communication trunks and is configured to deliver power along each communication trunk to power the at least one signal amplifier of the communication trunk. The power feed equipment is also configured to receive a shunt fault notification identifying an electrical shunt fault along a faulted communication trunk of the plurality of communication trunks. In response to the shunt fault notification, the power feed equipment is configured to cease delivery of power along at least one communication trunk.

29 Claims, 12 Drawing Sheets

(56) References Cited

U.S. PATENT DOCUMENTS

| | | | |
|---|---|---|---|
| 2009/0028566 A1* | 1/2009 | Abbott | H04B 10/038 398/83 |
| 2010/0316375 A1* | 12/2010 | Kram | H04B 10/808 398/25 |
| 2012/0106947 A1* | 5/2012 | Wang | H04B 10/0773 398/9 |
| 2014/0103739 A1* | 4/2014 | Takigawa | H02J 4/00 307/112 |
| 2015/0215238 A1 | 7/2015 | Kristiansen | |
| 2016/0203930 A1* | 7/2016 | Aida | H04B 3/44 307/113 |

* cited by examiner

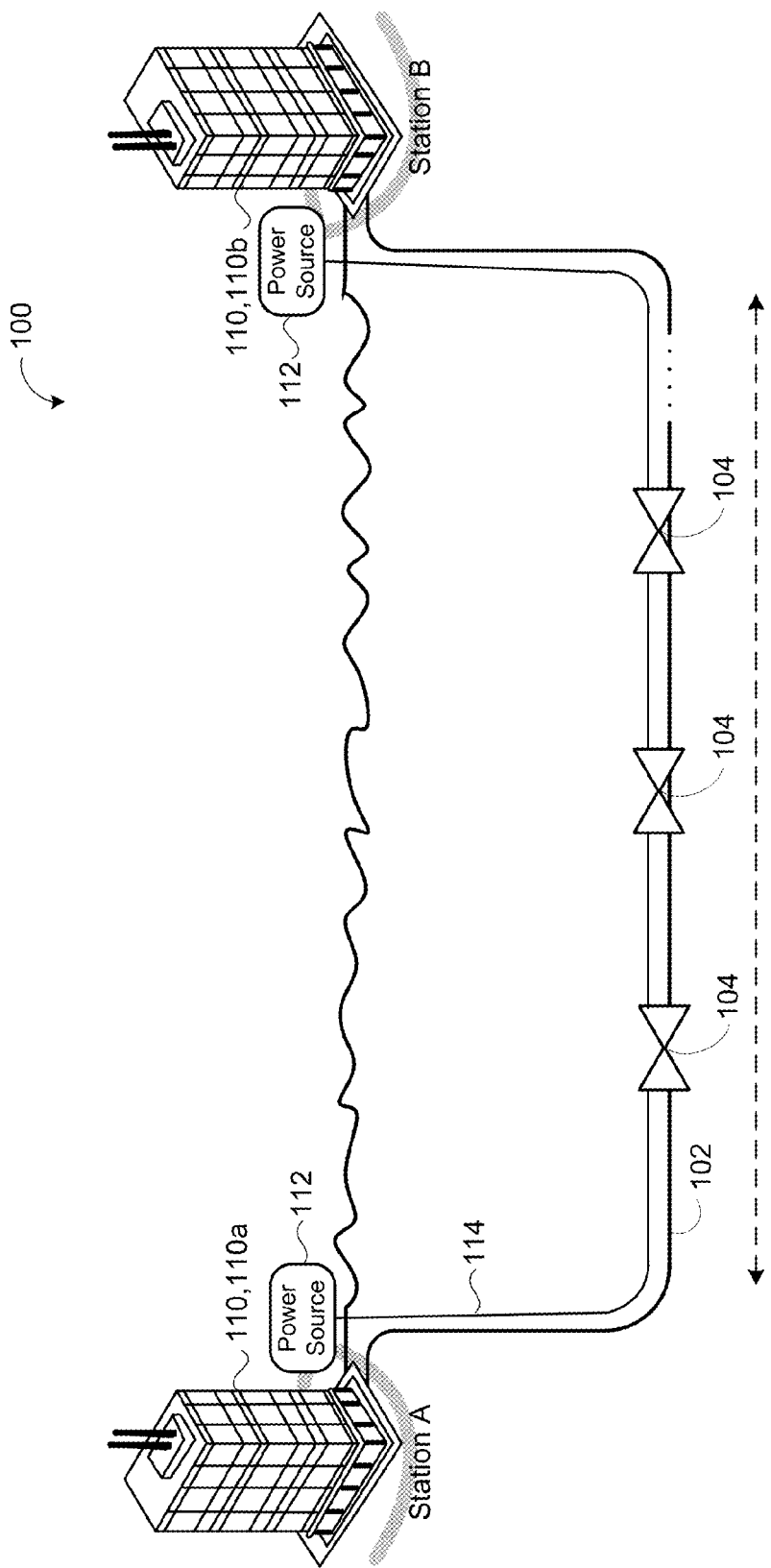
FIG. 1 - Prior Art

FIG. 4C Single-Mode single core fiber

FIG. 4D Multi-Mode single core fiber

FIG. 4E Single-Mode multi core fiber

FIG. 4F Multi-Mode multi core fiber

SUBSEA OPTICAL COMMUNICATION NETWORK

TECHNICAL FIELD

This disclosure relates to a subsea optical communication network along a sea bed connecting two or more land-based terminals.

BACKGROUND

Submarine optical communication cables are optical cables laid on the sea bed connecting land-based stations. The optical communication cables carry signals across the ocean allowing for cable communication over the sea between different continents. Each submarine optical cable may include multiple (up to eight) pairs of fibers, each fiber of the fiber pair transmitting a signal in an opposite direction. The submarine optical communication cable is generally divided into multiple sections. Each section is connected to the other section by a submarine repeater. As the signals are carried across the ocean, the signals may lose some of their power. Typically, each submarine repeater includes multiple Erbium Doped Fiber Amplifiers (EDFA) and an amplifier for the signal in each fiber. Each EDFA has a gain sufficient to compensate for the loss experienced by the signal during its propagation in the previous section of optical fiber cable. For example, a typical length of a fiber cable section between repeaters is about 60 kilometers. As such, a typical cable with a length of 10,000 kilometers has about 166 repeaters. The repeaters ensure that the land-based station, receiving the signal from another land-based station, receives and understands the signal. In other words, the repeaters increase the power of the signal to compensate for any loss during the signal propagation. The increased power translates to higher capacity because the clearer and more precise the optical signal is, the more complex signals may be sent from one land-based station to another.

Referring to FIG. 1, a typical communication system 100 includes first and second trunk terminals 110, 110a, 110b (also referred to as stations) coupled to a communication trunk 102. The communication trunk 102 may include one or more repeaters 104. The repeaters 104 are powered by a constant current, typically one Ampere by power feeding equipment (PFE) 112, e.g., power source located by the shore. Due to nonzero electrical resistivity of copper, even with large copper area conductor having a resistance as low as 1 Ohm/kilometer, power feeding voltage drops by 60 Volts at each section of cable, so that about half of power feeding voltage is lost due to heat dissipation in copper for the cable. In some examples, each PFE 112 can provide power feed voltage of up to 14 kilovolts. Further increase of power feeding voltage to higher than 14 kilovolts may result in a fault during cable operation. The power feeding equipment 112 powers the repeaters 104 by a power cable 114, such as a copper cable.

Submarine optical communication cables have been traditionally designed to be highly engineered to obtain long lasting lives (about 24 years), have very high-availability, and minimal risk tolerance, which resulted in extremely high initial cable costs. Thus, due to the high initial cable cost, some intercontinental routes via the ocean are not viable from a business consideration. Furthermore, if one cable portion is undergoing a malfunction, then the entire cable fails to transmit the communication between the first and second trunk terminals 110a, 110b. Therefore, it is desirable to redesign the communication cable architecture to provide reliable, cost effective intercontinental communications, even when a portion of the cable fails to transmit a communication.

SUMMARY

Submarine communication trunks are laid on a seabed and provide communication between two or more trunk terminals separated by the sea. The communication trunks carry communication signals across continents. A communication system includes a plurality of communication trunks that form a communication network. Each communication trunk includes communication links or segments coupled to one another at intermediate units. The communication links and the intermediate units form the communication network that extends between the two or more trunk terminals. The communication cables are low-availability communication cables. In other words, each one of the cable is operational for a low-availability period of time below a threshold period of time. However, the communication network as a whole forms a high-availability communication network that is operational for a period of time greater than the period of time associated with the low-availability period of time.

One aspect of the disclosure provides a communication system including a first trunk terminal, a second trunk terminal, and a plurality of communication trunks disposed along a floor of a body of water. The communication system includes power feed equipment coupled to the plurality of communication trunks. Each communication trunk couples the first trunk terminal to the second trunk terminal. Each communication trunk includes at least one signal amplifier configured to amplify a signal conveyed along a corresponding communication trunk. The power feed equipment is configured to deliver power along each communication trunk to power at least one signal amplifier of the communication trunk. In addition, the power feed equipment is configured to receive a fault notification identifying a cable cut fault or an electrical shunt fault along a faulted communication trunk of the plurality of communication trunks, and in response to the fault notification identifying the cable cut fault, route traffic from the faulted communication trunk to at least one non-faulted communication trunk. In response to the fault notification identifying the electrical shunt fault, the power feed equipment is configured to cease delivery of power along at least one communication trunk.

Implementations of the disclosure may include one or more of the following optional features. In some implementations, each one of the first and second trunk terminals includes a software-defined networking controller configured to reroute traffic from the faulted communication trunk to the at least one non-faulted communication trunk. Each communication trunk may have an availability level, and in response to the shunt fault notification, the power feed equipment may cease delivery of power to any communication trunks having a corresponding availability level dissatisfying a threshold availability level. Each communication trunk may have low-availability by having a communication delivery success rate of less than 99.9 percent. In some examples, the system includes a communication trunk network disposed along the floor of the body of water and coupling the first trunk terminal to the second trunk terminal. The communication trunk network may include the plurality of communication trunks and communication switches interconnecting two or more of the plurality of communication trunks.

In some examples, the communication system includes an intermediate unit connected to at one or more communication trunks between the first and second trunk terminals. The one or more communication trunks may include a plurality of communication cables. The intermediate unit may include a group of main signal amplifiers coupled to each communication cable and a backup signal amplifier. Each main signal amplifier may be coupled to a corresponding communication cable of the communication trunk and configured to amplify a signal of the corresponding communication cable. The backup signal amplifier may be a single backup signal amplifier coupled to two or more of the communication. Moreover, the backup signal amplifier may be configured to receive a failure notification indicating failure of one of the main signal amplifiers of the group of signal amplifiers, and in response to receiving the failure notification, amplify the signal conveyed along the corresponding communication cable. Each communication cable may include a fiber optic cable having a low-availability by having a communication delivery success rate of less than 99.9 percent. Each communication trunk may include a plurality of optical fibers and an electrical conductor. The electrical conductor may include at least one of copper or aluminum.

Another aspect of the disclosure provides a method that includes delivering power from power feed equipment of a first trunk terminal to a plurality of communication trunks disposed along a floor of a body of water. The method also includes receiving, at the power feed equipment, a shunt fault notification identifying an electrical shunt fault along a faulted communication trunk of the plurality of communication trunks. In response to the shunt fault notification, the method includes ceasing, at the power feed equipment, delivery of power along at least one communication trunk. Each communication trunk couples the first trunk terminal to a second trunk terminal. In addition, each communication trunk includes at least one signal amplifier configured to amplify a signal conveyed along a corresponding communication trunk. The delivered power is for powering the at least one signal amplifier of each communication trunk.

Implementations of the disclosure may include one or more of the following optional features. In some implementations, each communication trunk has an availability level. In response to the shunt fault notification, the method may include ceasing, at the power feed equipment, delivery of power to any communication trunks having a corresponding availability level dissatisfying a threshold availability level. Each communication trunk may have a low-availability by having a communication delivery success rate of less than 99.9 percent. Communication switches may interconnect two or more of the plurality of communication trunks forming a communication trunk network disposed along the floor of the body of water and coupling the first trunk terminal to the second trunk terminal.

In some examples, the method includes receiving, at a backup signal amplifier coupled to two or more of the communication cables, a failure notification indicating failure of a main signal amplifier to amplify a signal of a communication cable of the plurality of communication trunks. Additionally, in response to receiving the failure notification, the method includes amplifying at the backup amplifier, the signal conveyed along a corresponding communication cable associated with the main signal amplifier. Each communication cable may include a fiber optic cable having a low-availability by having a communication delivery success rate of less than 99.9 percent. Each communication trunk may include a plurality of optical fibers and an electrical conductor. The electrical conductor may include at least one of copper or aluminum.

Yet another aspect of the disclosure provides a second communication system that includes a first trunk terminal, a second trunk terminal, at least one communication trunk, and an intermediate unit connected to the at least one communication trunk. The at least one communication trunk is disposed along a floor of a body of water and coupling the first trunk terminal to the second terminal. The at least one communication trunk includes multiple communication cables. The intermediate unit is connected to the communication trunk between the first and second trunk terminals. The intermediate unit includes a group of main signal amplifiers coupled to each communication cable and a backup signal amplifier coupled to two or more of the communication cables. Each main signal amplifier is coupled to a corresponding communication cable and configured to amplify a signal conveyed along the corresponding communication cable. The backup signal amplifier is configured to receive a failure notification indicating a failure of one of the main signal amplifiers, and in response to receiving the failure notification, amplify the signal conveyed along the communication cable corresponding to the failed main signal amplifier.

Implementations of the disclosure may include one or more of the following optional features. In some implementations, a communication trunk network is disposed along the floor of the body of water and couples the first trunk terminal to the second trunk terminal. The communication network may include the multiple communication cables and communication switches interconnecting two or more of the multiple communication cables. The communication trunk network may also include communication trunks and communication switches interconnecting the communication trunks. Each communication trunk may also include a plurality of optical fibers and an electrical conductor. The electrical conductor may include at least one of copper or aluminum.

Yet another aspect of the disclosure provides a third communication system including: a first trunk terminal; a second trunk terminal; a communication trunk network disposed along a floor of a body of water and coupling the first trunk terminal to the second trunk terminal; and power feed equipment coupled to the communication trunk network. The communication trunk network includes: communication trunks; communication switches interconnecting the communication trunks; and an intermediate unit connected to each communication trunk between the first and second trunk terminals. Each communication trunk includes a plurality of communication cables. The intermediate unit includes a group of main signal amplifiers. Each main signal amplifier is coupled to a corresponding communication cable of the corresponding communication trunk and configured to amplify a signal of the corresponding communication cable. A backup signal amplifier is coupled to each communication cable or two or more of the communication cables of the corresponding communication trunk. The backup signal amplifier is configured to receive a failure notification indicating failure of one of the main signal amplifiers, and in response to receiving the failure notification, amplify the signal conveyed along the communication cable corresponding to the main failed signal amplifier. The power feed equipment is configured to deliver power along each communication trunk to power the corresponding intermediate unit and/or the switches. The power feed equipment is also configured to receive a shunt fault notification identifying an electrical shunt fault along a faulted communication trunk of the communication trunks. In response to the shunt fault notification, the power feed equipment is configured to cease delivery of power along at least one communication trunk.

Implementations of the disclosure may include one or more of the following optional features. In some implementations, each communication trunk network includes an electrical conductor in electrical communication with the power feed equipment. The electrical conductor may include at least one of copper or aluminum.

Yet another aspect of the disclosure provides a fourth communication system including: a first trunk terminal; a second trunk terminal; a communication trunk network; and a controller. The communication trunk network includes first and second communication trunks disposed along a floor of a body of water and coupling the first trunk terminal to the second trunk terminal. Each trunk includes fiber pairs. The communication trunk network includes: repeaters disposed on with the first and second communication trunks; a first power cable extending from the first trunk terminal to the second trunk terminal; and a second power cable extending from the first trunk terminal to the second trunk terminal. The first power cable is configured to power the repeaters associated with the first communication trunk. The second power cable is configured to power the repeaters associated with the second communication trunk. The controller is configured to control power delivery to the communication network by identifying one or more repeaters to be unpowered by the corresponding one or more power cables. In addition, the controller controls power delivery to the communication network by bypassing powering of the one or more identified repeaters, and receiving a fault notification. In response to receiving the fault notification reassessing the identification of one or more repeaters to be unpowered by the corresponding one or more power cables, and bypassing the powering of the one or more reassessed-identified repeaters.

Implementations of the disclosure may include one or more of the following optional features. In some implementations, the communication trunk network includes a communication switch having a first connector connecting the first and the second communication trunks and a second connector connecting the first and second power cables. In some examples, the fault notification identifies a cable cut fault or an electrical shunt fault along the faulted communication trunk. The controller is configured to: in response to a fault notification identifying the cable cut fault, route traffic from the faulted communication trunk to a non-faulted communication trunk; and in response to a fault notification identifying the electrical shunt fault, ceasing deliver of power along at least one communication trunk. The controller may also include first and second software-defined networking controllers, each one of the first and second software-defined networking controllers located at the first and second trunk terminal respectively.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a schematic view of a prior art optical communication system having on shore power sources.

FIG. 4C is a schematic view of a cross-section of an example single-mode single-core optical fiber.

FIG. 4D is a schematic view of a cross-section of an example multi-mode single-core optical fiber.

FIG. 4E is a schematic view of a cross-section of an example single-mode multi-core optical fiber.

FIG. 4F is a schematic view of a cross-section of an exemplary multi-mode multi-core optical fiber.

Like reference symbols in the various drawings indicate like elements.

DETAILED DESCRIPTION

Figure 2A:
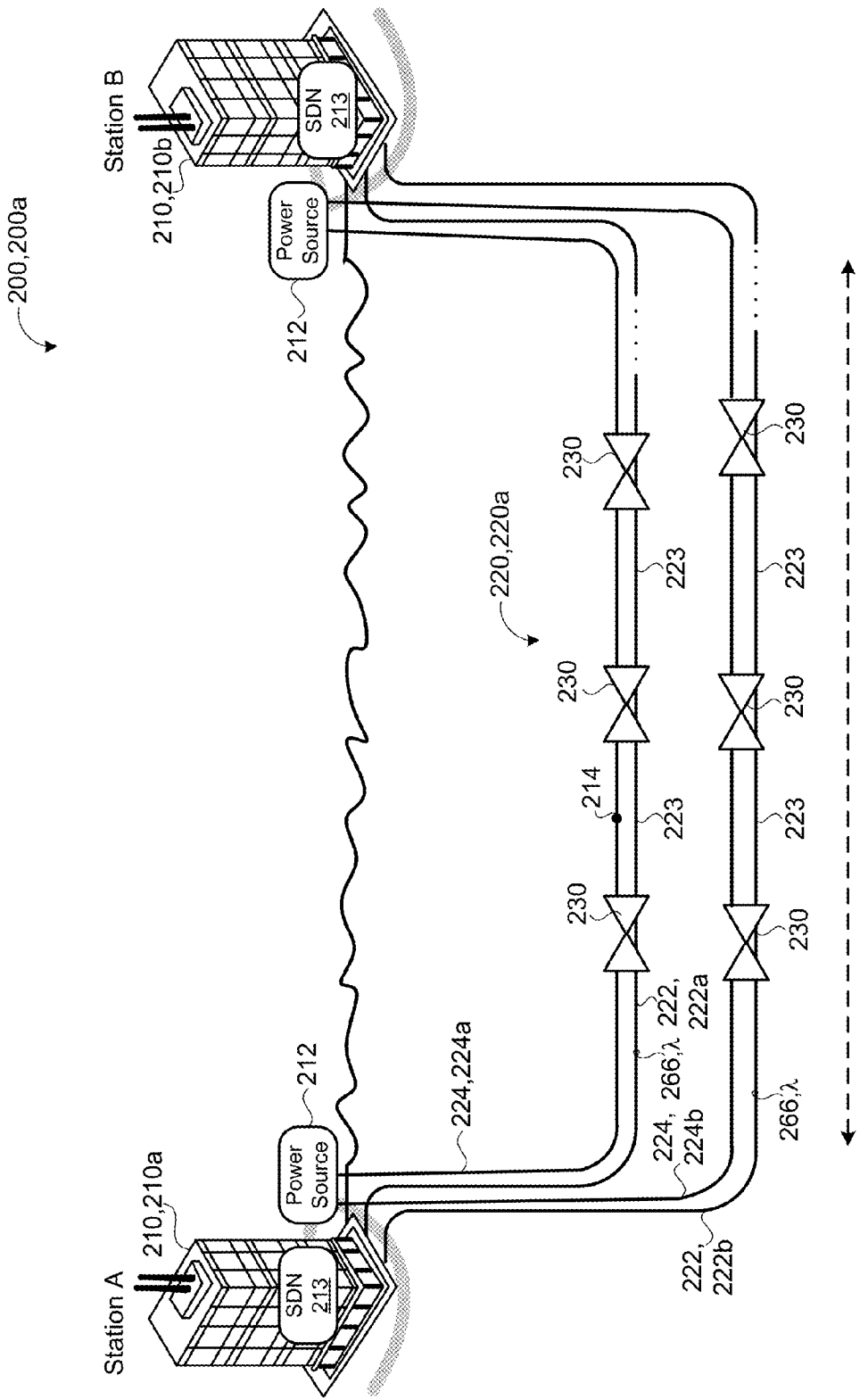
FIG. 2A is a schematic view of an example optical communication system between two trunk terminals having two optical communication trunks each associated with a power cable.

An optical communication system 200, 200a-e, as illustrated in FIGS. 2A-2E, provides an approach to transoceanic optical communications that results in low-cost submarine wet plant cables that may be used by datacenters and network operators. The optical communication system 200, 200a-e provides a communication trunk network 220, 220a-e of communication trunks 222, 400 that may transmit communications 266 from a first trunk terminal 110, 110a to a second trunk terminal 110, 110b. Due to the architecture of the communication trunk network 220, 220a-e, any malfunction of a communication trunk 222, 400, a portion of a communication trunk 400 (e.g., a trunk link 402), or a power cable 224 does not result in a communication signal 266 failing to reach its destination. Therefore, the optical communication system 200, 200a-e is designed to withstand failures associated with a communication trunk 222, 400, a portion of a communication trunk 400 (i.e., a trunk link 402), or the power cable 224 by rerouting a communication 266 within the trunk network 220 to another communication trunk 222, 400 or communication trunk link 223, 402.

Figure 2B:
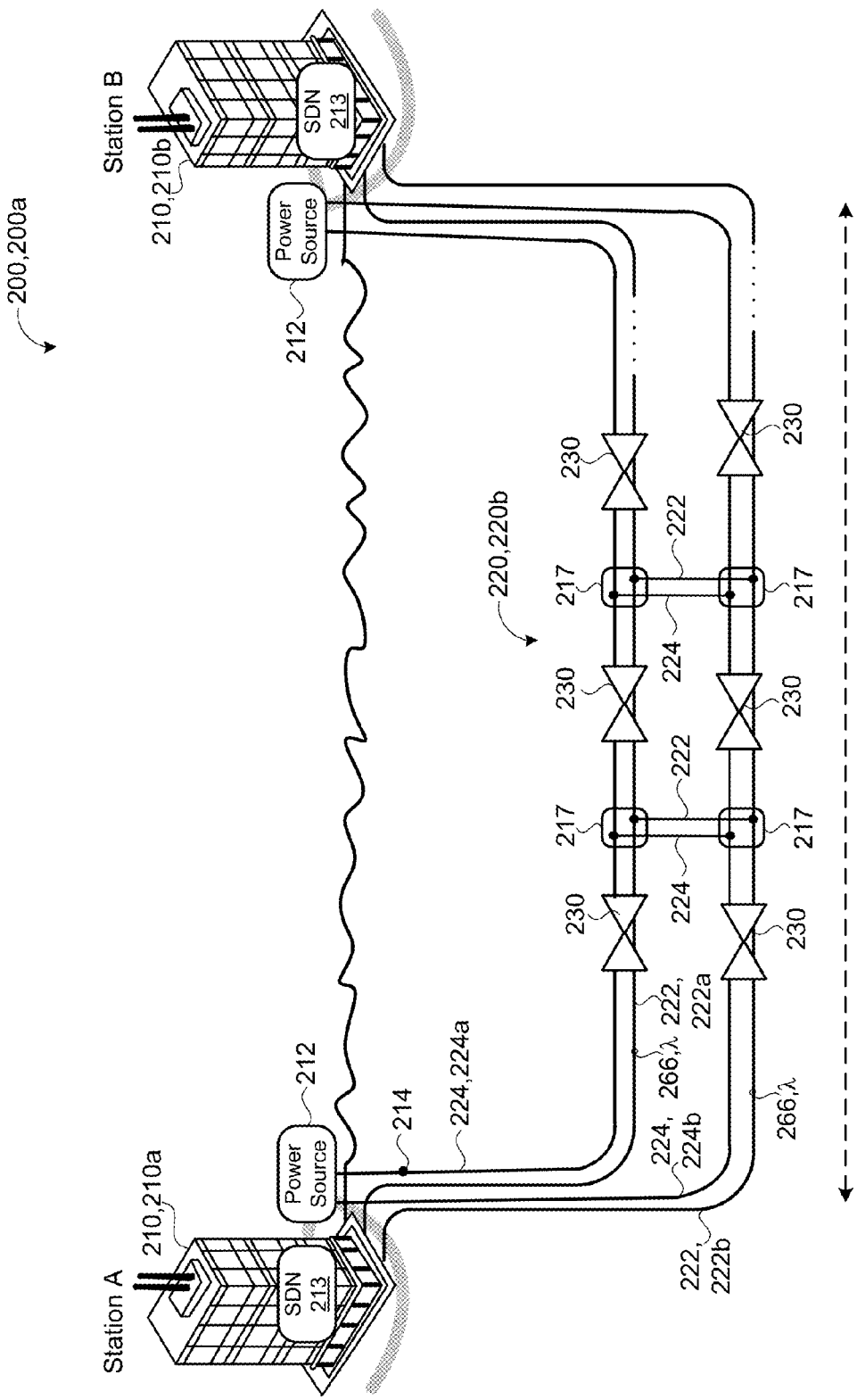
FIG. 2B is a schematic view of an example optical communication system between two trunk terminals having two optical communication trunks each associated with a power cable and including communication switches.
Figure 2C:
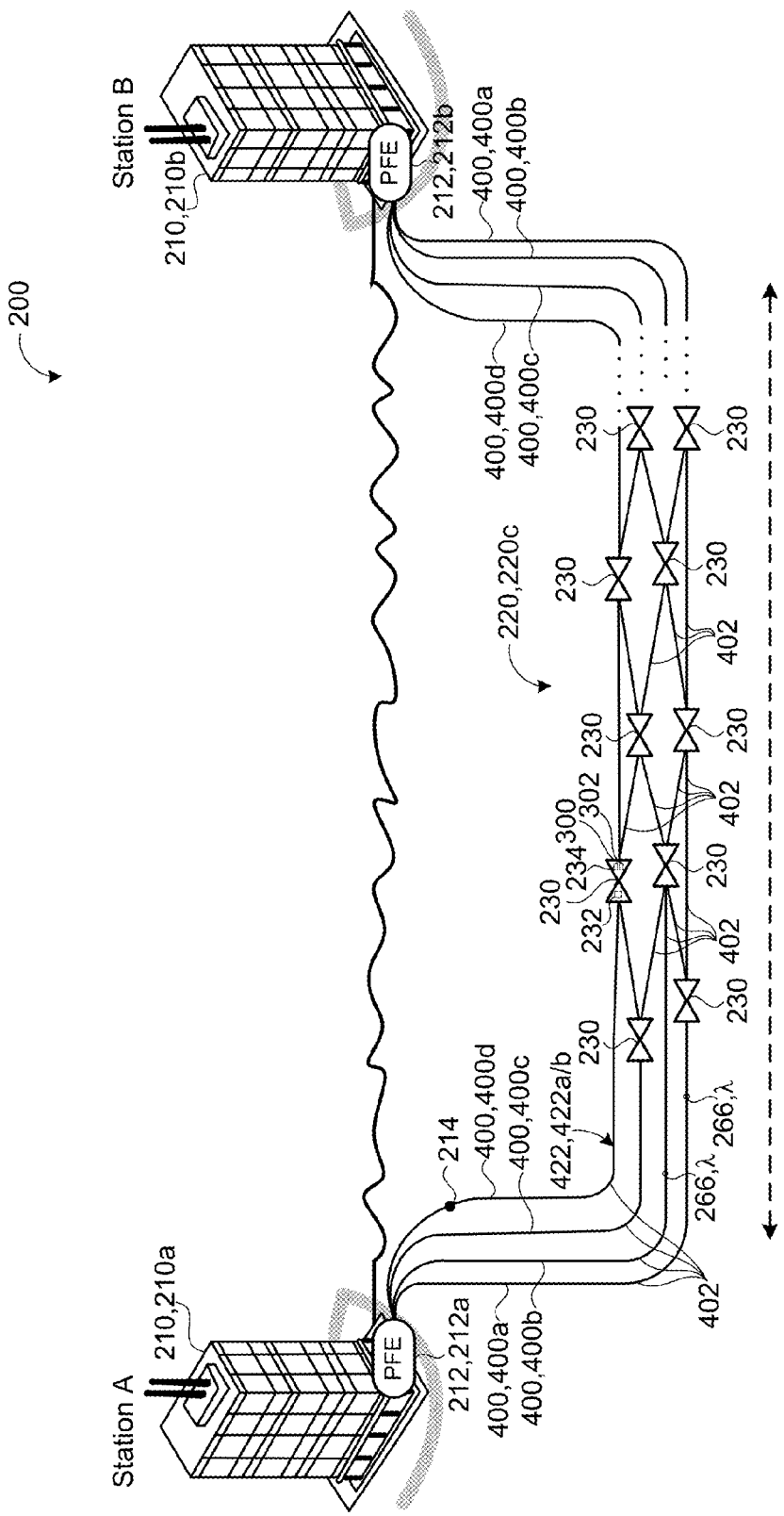
FIG. 2C is a schematic view of an example optical communication system having an optical communication network between two trunk terminals.
Figure 2D:
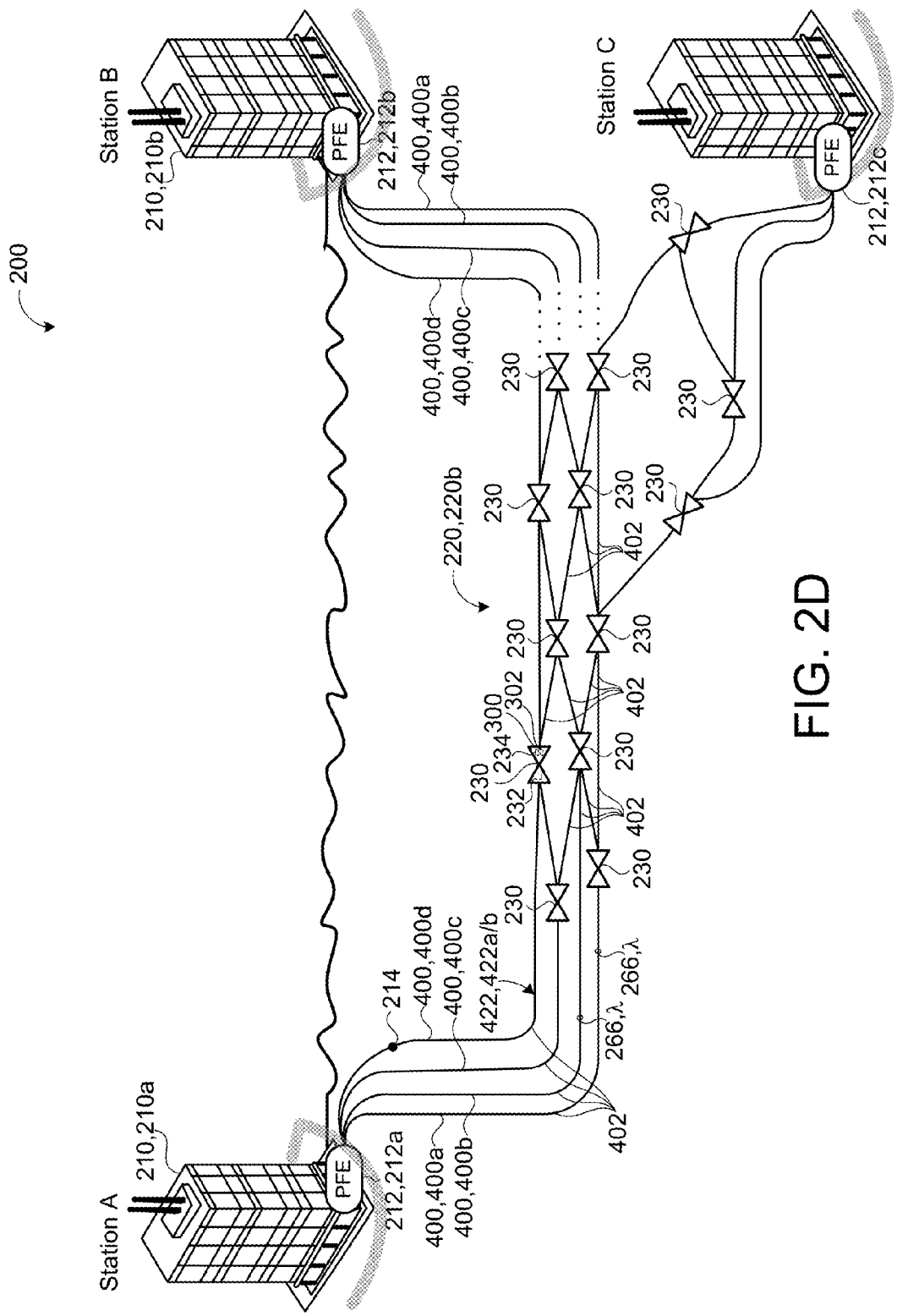
FIG. 2D is a schematic view of an example optical communication system having an optical communication network between three trunk terminals.
Figure 2E:
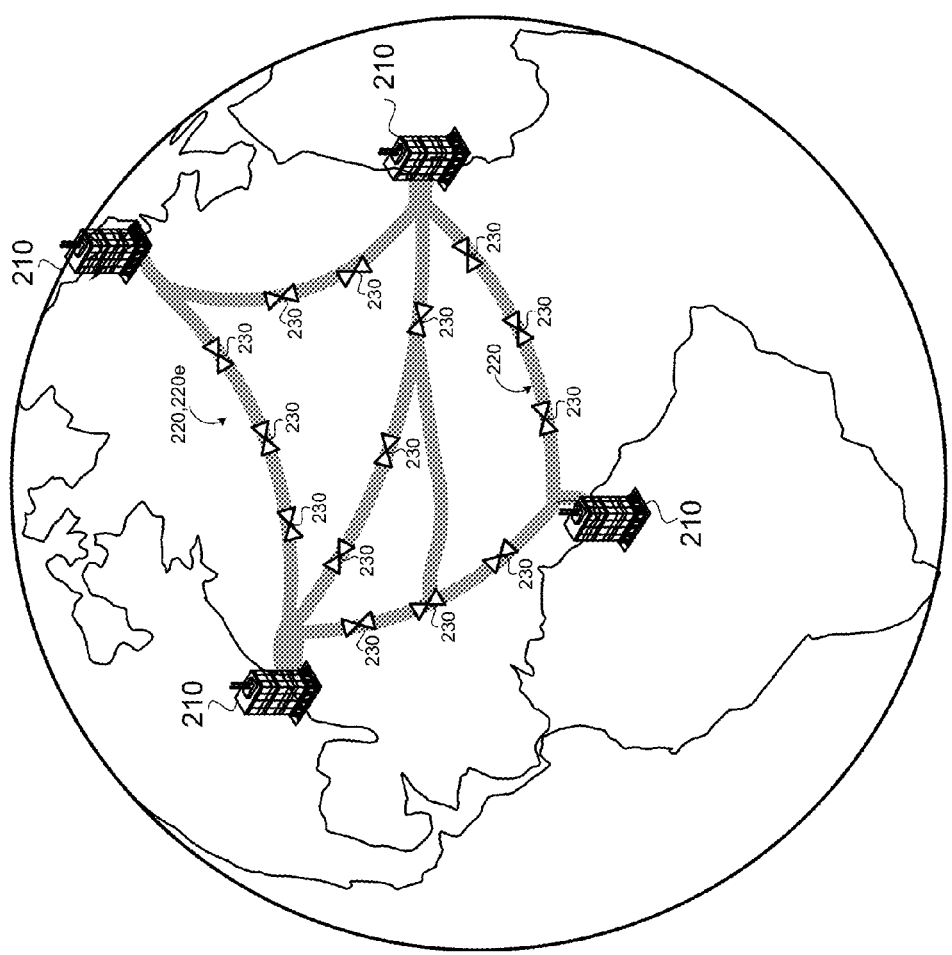
FIG. 2E is a schematic view of an example optical communication system having an optical communication network between four trunk terminals.

The optical communication system 200, 200a-e includes trunk terminals 210 (also referred to as stations) coupled to the communication trunk network 220. The coupling may be any connection, link, or the like by which signals carried by one system element are imparted to the "coupled" element. The coupled elements may not necessarily be directly connected to one another and may be separated by intermediate components or devices that may manipulate or modify the signals. In the example shown in FIGS. 2A-2C, there are two trunk terminals 210, a first trunk terminal 210, 210a and a second trunk terminal 210, 210b; however, more than two trunk terminals 210 may be included in the optical communication system 200, 200a-e as shown in FIGS. 2D and 2E. The first and second trunk terminals 210, 210a, 210b are coupled to the communication trunk network 220, 220a-e. The communication trunk network 220 includes communication trunks 400, where each communication trunk 400 is coupled to one or more repeater 230. Each communication trunk 222, 400 may include a plurality of optical cable segments or trunk links 223, 402 that carry optical signals 266 on a corresponding optical channels/wavelengths λ. Each communication trunk link 223 shown in FIGS. 2A and 2B may include one or more fiber optic cables grouped in fiber pairs to provide a transmission path for bi-directional communication of optical signals 266 between the trunk terminals 210. As shown in FIGS. 2C-2E, each communication trunk link 402 may include one or more fiber optic cables 422 grouped in fiber pairs 422a/b to provide a transmission path for bi-directional communication of optical signals 266 between the trunk terminals 110. The communication trunk links 223 shown in FIGS. 2A and 2B are associated with a separate power cable 224, while the communication trunk links 402 shown in FIGS. 2C-2E have a power tube 410 that wraps around the communication trunk links 402, thus eliminating the use of power cables 224 that run adjacent the communication cables 222 along the seabed (FIGS. 2A and 2B). The communication system 100 may be configured as a long-haul system, e.g., having a length between at least two of the trunk terminals 110, 110a, 110b of more than about 600 kilometers, and may span a body of water, e.g., an ocean and having a length of 6,000-12,000 kilometers. The optical communication system 200, more specifically, each trunk terminal 210 includes power feed equipment (PFE) 212, 212a, 212b, 212c coupled to the communication trunks 400 to provide power to the repeaters 230.

Power Feed Equipment

In some implementations, PFE 212 feeds power (i.e., constant current, direct current (DC)) to the communication trunk network 220, and specifically to the repeaters 230 coupled to the communication trunks 400. The PFE 212 is configured to output ultra-high voltage output supply power allowing the PFE 212 to power feed the power cable 224 (FIGS. 2A and 2B) or the communication trunks 400 (FIGS. 2C-2D) that span long distances, for example, across the oceans over a long period of time.

Referring back to FIG. 1, usually, each PFE 112 feeds both positive and negative voltage corresponding to half of the total system voltage. Therefore, if a fault occurs in either one of or close to one of the two PFEs 112, the other PFE 112 at the opposite trunk terminal 110 feeds the total voltage in order to enable a constant current supply to the repeaters 104. For example, if each PFE 112 is capable of generating a maximum of 15 kilowatts, then each PFE 112 operates at half its maximum voltage, 7.5 kilowatts, to cover failures (e.g., shunt fault within the cable 224). A shunt failure is a failure that occurs with submarine communication cables 224, when the cable insulation is damaged, causing a short circuit from a metallic core of the cable to the seawater directly.

Referring back to FIG. 2A, as shown, the optical communication system 200, 200a includes the optical communication network 220, 220b, which in turn includes two communication trunks 222 (e.g., a first communication trunk 222a and a second communication trunk 222b) and each of the communication trunks 222 has a corresponding power cable 224a, 224b separate from the communication trunk 222. Each trunk terminal 210 includes a Software Defined Network (SDN) controller 213, which executes an application for software-defined networking that manages flow control to enable intelligent networking. The SDN controllers 213 are based on protocols that allow servers to tell switches where to send packets. Therefore, when a shunt fault occurs at one of the communication trunks 222 or trunk links 223, the SDN controller 213 detects that the one of the communication trunks 222 or trunk links 223 is down (i.e., by receiving a shunt fault notification 214) and diverts the communication traffic to the other one of the communication trunks 222 or trunk links 223 from the trunk terminal 210. For example, if the SDN controller 213 detects that the first communication trunk 222a is down, then the SDN controller 213 directs the communication traffic to the second communication trunk 222a, and vice versa. As shown, only two communication trunks 222 and corresponding power cables 224 are shown, but more may be used as well.

The communication system 200b of FIG. 2B also includes SDN controllers 213 at each trunk terminal 210. In this case, the communication network 220b allows for intermediate switching between the first communication trunk 222a and the second communication trunk 222b using communication switches 217 that connect the first communication trunk 222a to the second communication trunk 222b and the first power cable 224a to the second communication cable 224b. As such, when a shunt fault occurs at one of the trunk links 223 of one of the communication trunks 102, the SDN controller 213 detects that the trunk link 223 is down (i.e., by receiving a shunt fault notification 214) and diverts the communication traffic to another trunk link 223 of the other one of the communication trunks 102 using the communication switches 217. For example, if the SDN controller 213 detects that the trunk link 223 of the first communication trunk 222a is down, then the SDN controller 213 directs the communication traffic to a trunk link 223 of the second communication trunk 222a, and vice versa. As shown, only two communication trunks 222 and corresponding power cable 224 are shown, but more may be used as well. In addition, the communication switches 217 may be positioned at different intervals of the communication network 220b.

Referring back to FIGS. 2A-2E, as shown, the optical communication system 200, 200a-e includes the optical communication network 220, 220a-e, which in turn includes the communication trunk links 224, 400 or trunk links 223, 402. Therefore, when a shunt fault occurs at one of the communication trunks 400 or trunk links 402, the optical communication system 200, 200a-e selectively shuts down a subset of or all the fiber pairs 422a/b associated with the communication trunk 400 experiencing the shunt fault. As such, the communication system 200, 200a-e accommodates for the reduced amount of voltage that is available and being received at each repeater 230 because of the shunt fault. Therefore, the optical communication system 200, 200a-e uses the maximum voltage that the PFE 212 is configured to output and re-routes the communication traffic to accommodate for shutting down the subset of or all the fiber pairs 422a/b. In other words, the reconfigurable optical communication network 220, 220a-e allows for traffic re-routing upon a shunt failure. In some examples, the optical communication fibers 422 within the communication trunk 102, 400 are assigned as high priority fibers 422 (or high priority fiber pairs 422a/b) and low priority fibers 422 (or low priority fiber pairs 422a/b). In some examples, upon a shunt failure, the low priority fibers 422 are the fibers 422 that the optical communication network 200, 200a-e shuts down to allow the high priority fibers 422 to carry on with their transmissions uninterrupted. By allowing each PFE 212 to continuously output at its maximum voltage output and shutting down low priority fibers 422 within the optical communication network 220 when a shunt failure occurs, the performance of the optical communication network 220 is substantially improved. The substantial improvement of the performance of the communication network 220 is due to the network 220 maintaining the use of the maximum power of each PFE 112 instead of half the power that the PFE 112 can supply. In addition, by using the maximum voltage output that each PFE 212 is configured to output, the additional power (due to the network 220, 220a-e design) is used to increase the capacity of the optical communication trunks 400. As a result, the optical communication network 200, 200a-e better utilizes and balances its available resources.

In some implementation, the communication network 220 maximizes the use of power outputted from each PFE 212 by configuring specific repeaters 230 to bypass being powered by the power cable 224, 410. The bypassed repeater 230 causes loss of traffic on the fiber pair associated with the communication cable 222, 400, so the communication cable 222 becomes a low availability communication cable 22. The power needed on the power cable 224 associated with the communication cable 222 associated with the bypassed repeaters 230 is reduced since there are fewer repeaters 230 being powered and the voltage drop of the repeater 230 is also reduced. In the event of a shunt, the zero voltage point (e.g., previously the bypassed repeater 230) is moved to the shunt location. In other words, the bypassed repeater 230 is no longer bypassed and repeats the received communication signal 266. In this example, the power outputted from the PFE 212 remains the same upon a shunt, while the network 220, 220a-e adjusts its usage of the received power.

Communication Trunk Network

The optical communication system 200 includes the communication trunk network 220. The communication trunk network 220 includes communication trunks 400, where each communication trunk 400 may be coupled to one or more repeaters 230. Each communication trunk 400 may include multiple communication cable segments or trunk links 402, 402a-n, the plurality of which forms the communication trunk 400. Each trunk link 402 of the communication network 220 may be designed as a low-availability trunk link 402. Availability is the probability that a system as a whole (e.g., the optical communication system 200) or an element within the system (e.g., the trunk link 402), is operating properly when it is requested for use. More specifically, availability is the probability that the system or element of the system does not fail or is not undergoing a repair action when it needs to be used. The system or element of the system of the optical communication system 200 may be designed as a high-availability system/element or a low-availability system/element. A high-availability system/element ensures that the system/element provides agreed level of operational performance for a higher than normal period. A high-availability system/element is designed to eliminate a single point of failure; therefore, the system/element is designed by including redundant components, which means that a failure of one component of the system/element does not mean failure to the entire system/element. Moreover, high-availability systems/elements are designed to detect a failure as it occurs. As such, in a high-availability system/element, a user may never see a failure even when a maintenance activity is occurring. Availability is usually expressed as a percentage of uptime or operation in a given year of the system or specific elements of the system. Uptime does not take into account if the end communication system or end terminal 210 has issues or is experiencing a malfunction. Thus, if the communication from the first terminal 110a is not transmitted due to a reason unrelated to the communication trunks 400, then the failure of the communication reaching the end terminal 110b is not taken into account or considered in the determination of the percentage of uptime. The low-availability communication trunks 400, 402 may have a high priority or low priority.

In some examples, a 90% availability of a system/element, also referred to as "one nine," implies that the system/element has a downtime of 2.4 hours each day, i.e., 16.8 hours (2.4*7) each week, 72 hours per month, or 36.4 days per year. A 99% availability of a system/element, also referred to as "two nines," implies that the system/element has a downtime of 14.4 minutes each day, i.e., 1.68 hours each week, 7.2 hours per month, or 3.64 days per year. A 99.9% availability of a system/element, also referred to as "three nines," implies that the system has a downtime of 1.44 minutes each day, i.e., 10.1 minutes each week, 43.8 minutes per month, or 8.76 hours per year. A 99.99% availability of a system/element, also referred to as "four nines," implies that the system/element has a downtime of 8.66 seconds each day, i.e., 1.01 minutes each week, 4.38 minutes per month, or 42.46 minutes per year. The same reasoning applies for availabilities of 99.999% (five nines), 99.9999% (six nines), 99.99999% (seven nines), 99.999999% (eight nines), and 99.9999999% (nine nines). The percentage of a particular order of magnitude is sometimes referred to as the number of nines, or "class of nines" in the digits. As indicated above, communication that is delivered without interruptions 99.99% of the time would have four nines reliability, or class four. Therefore, the optical communication system 200 may be considered a low-availability system when its availability is 99% or less (two nines or less), and the optical communication system 200 may be considered a high-availability system when its availability is 99.9% or more (three nines or more). As such, a system with 99.9% availability means that 99.9% of the communication is going from a first terminal 210 to a second terminal 210.

Availability A of a hardware/software module may be determined by the formula below:

$$A = \frac{MTBF}{MTBF + MTTR}; \tag{1}$$

where MTBF is the mean time between failures or the average time between the failures of the modules. MTTR is the mean time to repair a failure. The manufacturer of a hardware module may estimate MTBF before a failure occurs in the module. As for software modules, MTBF may be determined by multiplying the defect rate with KLOCs (thousands of lines of code) executed per second. MTTR is the time taken to repair a failed hardware module. In an operational system, repair generally means replacing the hardware module. Therefore, hardware MTTR may be considered as the mean time to replace a failed hardware module. MTTR for a software module may be computed as the time taken to reboot after a software fault is detected. Thus, software MTTR may be viewed as the mean time to reboot after a software fault has been detected.

The optical communication network 220 includes multiple diversity (i.e., independent failure domains) low-availability trunk links 402 (i.e., having an availability of 99% or less, or two nines or less) coupled to at least one repeater 230, where the combination of multiple trunk links 402 results in a high-availability optical communication network 220. Therefore, although each trunk links 402 is a low-availability cable 402, the combination of the multiple low-availability trunk links 402 results in a high-availability communication network 220. Low-availability trunk links 402 are cheaper than high-availability trunk links 402. Consequently, by using the low-availability trunk links 402, the cost of the optical communication network 200 is significantly reduced. As such, the use of multiple diverse, low-cost, low-availability links 402 to realize a high network level availability is advantageous over the traditional single high-availability cables (shown in FIG. 1). For example, for a very high target availability, such as 99.99% or higher, it is typically more cost effective to build multiple-lower cost, lower availability trunks 402 with diversity (i.e., independent failure domains) than a single highly engineered cable for high-availability.

Each communication trunk 400 is configured to provide communication services at different availability levels. For example, the services may range from a premium high-availability service to a best-effort lower availability service. The premium high-availability services are allocated to communication of important data, while the best-effort lower availability services are allocated to communication having lower priority. The optical communication network 220 may be designed to optimize its communication transmissions by using the multiple services available. For example, a communication associated with a high-availability service is carried out on three cable trunks 400, a communication associated with a medium availability service is carried on two cable trunks 400, and a communication associated with a low-availability service is carried over one cable trunk 400. In contrast to FIG. 1, where the communication system 100 uses a single communication trunk 102 that is over-engineered and designed as a high-availability cable to support all service ranges, the optical communication system 200, such as the example shown in FIGS. 2A-2C, significantly reduces the cost of high-availability trunks by using multiple low-availability trunks 400, the combination of which results in a high-availability system 200.

Therefore, a difference between a link-level design (FIG. 1, using a high-availability trunk) and the network level design described in FIGS. 2A-2C relates to the service level availability. As such, in a link-level design (FIG. 1—prior art) the focus and cost are associated with the trunk 102 being a high-availability trunk 102. Whereas, in a network-level design, the end goal of the optical communication system 200 is to deliver a communication 266 from the first trunk terminal 110*a* to the second trunk terminal 110*b*. As such, the optical communication system 200 may be designed using multiple low-availability trunks 400 whose combination results in a high-availability network 220.

In some implementations, the use of multiple optical communication trunk links 402 allows the optical communication system 200 to transmit pre-emptible services in communication trunk links 402 that are configured for use when a primary path fails. For example, if a primary communication path between the trunk terminals 110 using a primary group of trunk links 402 fails, a secondary communication path may be used that allows for communication using communication trunk links 402 not being the same as the communication trunks of the first path.

Repeater

The communication trunk links 402 are coupled to one or more repeaters 230, which collectively make-up the communication network 220. The repeater(s) 230 may incorporate an electrical switch 232, and a power supply 234 powering one or more amplifiers 300 of the repeater 230. The power supply 234 receives power from the PFE 212 via the communication trunk 400. The electrical switch 232 allows the power supply 234 in the repeater 230 to only power the amplifier 300 corresponding to a selected fiber pair 422, 422*a/b* of the communication trunk 400 upon a shunt. These selected fiber pairs 422*a/b* may correspond to fiber pairs 422*a/b* that are running the highest priority traffic. Each repeater 230 is designed to be maintenance free once is it laid on the seabed. In addition, each repeater 230 is configured to have high resistance to water pressure and high performance sealing, i.e., a housing of the repeater 230 is designed to withstand a pressure of about 8,000 meters of water depth.

Each repeater 230 is configured to amplify signals 266 of each fiber 422 of the fiber pair 422, 422*a/b* going in the opposite direction. The amplifiers 300 may include any optical amplifier configuration that compensates for signal attenuation on the transmission path. For example, one or more repeaters 230 may be configured as an optical amplifier 300, such as an erbium doped fiber amplifier (EDFA), a Raman amplifier, or a hybrid Raman/EDFA amplifier. Optical amplifiers are devices that amplify an optical signal directly without converting the signal to an electrical signal first. An optical amplifier may be considered a laser without an optical cavity. Doped fiber amplifiers (DFAs) are optical amplifiers that use a doped optical fiber (i.e., an optical fiber containing a dopant, which is a trance impurity element that is inserted into a substance (in very low concentration) to alter the substance's optical properties) as a gain medium to amplify the optical signal. The signal to be amplified and a pump laser 304 (from the LD 302) are multiplexed into the doped fiber 400, 422, and the signal 266 is amplified through interaction with doping ions. EDFA is the most common example of DFAs, where the core of a silica fiber is doped with trivalent erbium ions and may be efficiently pumped with a laser at wavelengths of 980 nm or 1,480 nm and still exhibit gain in the 1,440 nm region. In a Raman amplifier, the signal is intensified by Raman amplification, which is based on the stimulated Raman scattering (SRS) phenomenon, when a lower frequency signal photon induces the inelastic scattering of a higher-frequency pump photon in an optical medium in the non-linear regime. This results in another signal photon being produced, with the extra energy between pump and signal frequencies passed to the vibrational states of the medium, allowing for optical amplification. Therefore, the Raman amplification produces nonlinear interaction between the signal and a pump laser within the optical fiber (unlike the EDFA). The main advantage of Raman amplification is its ability to provide distributed amplification within each fiber segment 400, which increases the length of the fiber segment 400 before the next amplifier 230. A system bandwidth may coincide with the usable bandwidth of the optical amplifiers within the system 200.

Figure 3A:
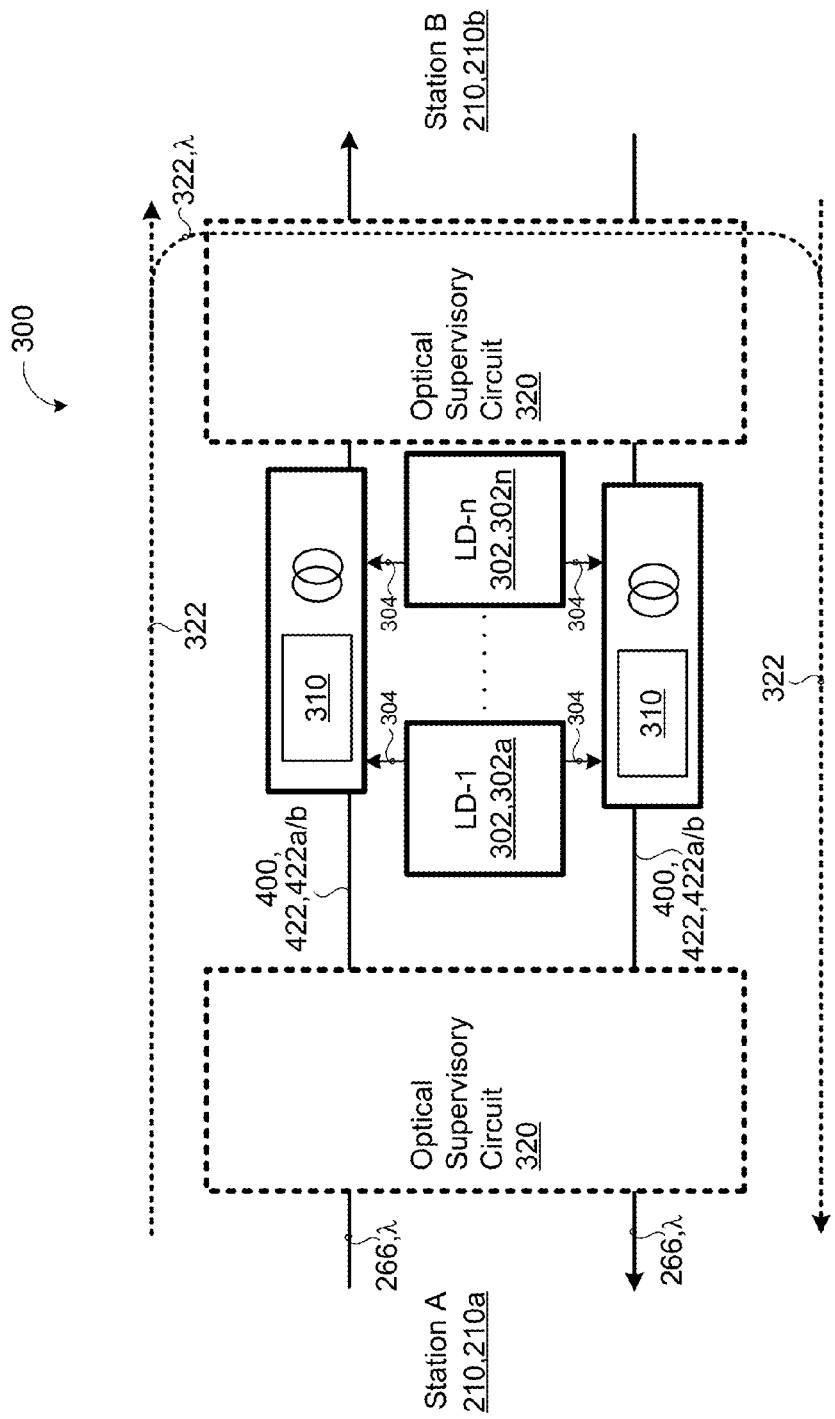
FIG. 3A is a schematic view of an example amplifier with a shared backup pump.

Referring to FIG. 3A, in some examples, the amplifier 300 associated with each repeater 230 includes a laser diode 302 that outputs a pump laser 304 to a coupler 310, which injects the pump laser 304 into the EDFs of each fiber 422 of a fiber pair 422a/b associated with an optical communication trunk 400. Each pump laser diode 302 is controlled so that the laser diode output, i.e., the pump laser 304, is constant. In some examples, the operation status of the optical repeater 230 is monitored using a supervisory signal 322 with a dedicated wavelength from all the wavelengths transmitted from the station terminal 210. The repeater 230 may include an optical supervisory circuit 310 that receives the supervisory signal 322 and retransmits the supervisory signal to its source (i.e., the transmitting station 210). In other words, the optical supervisory circuit 320 loops back the supervisory signal 322, allowing the station 210 that transmitted the supervisory signal 322 to analyze the received supervisory signal 322 and the gain of each repeater 230 from the level of the supervisory signal wavelength 322, $\lambda$ and detects faults, such as any loss increases in the trunk 400 or a failure of an optical repeater 230.

Pump Sharing

Figure 3B:
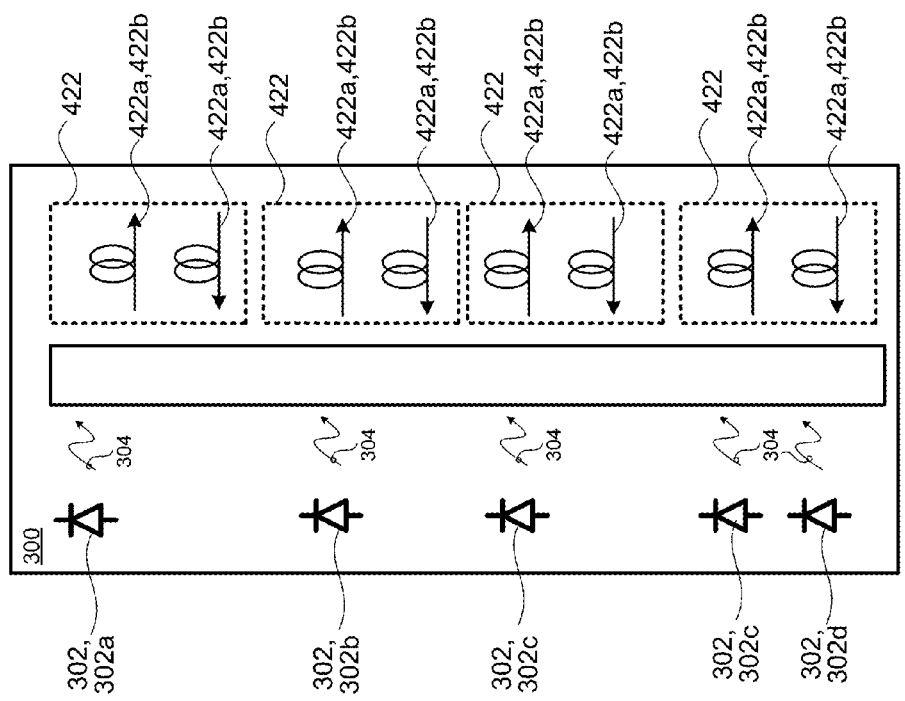
FIG. 3B is a schematic view of an example repeater including a backup pump laser diode that supports the main pump laser diodes associated with each fiber pair.

Each repeater 230 includes the optical amplifier 300 (e.g., a fiber amplifier) that amplifies a communication signal 266 received at the repeater 230. The optical amplifier 300 receives an input signal 266 from a communication trunk 400 transmitted from one of the communication stations 210. In some examples, the optical amplifier 300 includes pump laser diodes 302 that provide power laser pump 304 to the optical trunk 400. For example, each laser diode 302 provides pump power to a fiber pair 422, 422a/b. However, instead of dedicating a set of backup laser diode pumps 302 for each fiber pair 422, 422a/b in addition to a laser diode 302 dedicated for each fiber pair 422, 422a/b, which means each fiber pair 422, 422a/b has a dedicated main pump laser diode 302 and one to three backup pump laser diodes 302, the communication network 220 reduces the number of redundant or backup pump laser diodes 302b by sharing the pump laser diode 302. In other words, a single pump laser diode 302 may be shared across two or more of the fiber pairs 422, 422a/b. For example, traditional repeaters have extremely high-availability that occurs because of their redundant configuration, each laser diode is specifically screened and tested for high-availability, each set of laser diodes is dedicated to pumping a specific transmission fiber in the cable, and availability is based on worst case temperature of 34-40 degrees Celsius, while most undersea deployments have a much lower ambient temperature, which is around five degrees Celsius. In addition, traditionally if there are six fiber pairs 422, 422a/b, then each fiber pair 422, 422a/b would be associated with a main pump laser diode 302 and one to three redundant pumps 302, resulting in a total of 12-24 (i.e., 6+6(1)=12 or 6+6 (3)=24) pump laser diodes 302, 302a, 302b. However, as shown in FIGS. 3A and 3B, if the redundant pump laser diodes 302b are shared, then the number of laser diodes 302 may significantly decrease. For example, if there are six fiber pairs 422, 422a/b, then each fiber pair 422, 422a/b would have a shared main pump diode 302 and the six fiber pairs 422, 422a/b would all share the redundant pump diode 302. By sharing the main and redundant pump diodes 302, the six fiber pairs 422, 422a/b would be associated with a total of 7-9 (6+1=7 or 6+3=9) pump diodes 302. In some examples, the use of commercial, lower cost pump diodes 302 in addition to reducing the redundancy for pumping reduces the overall cost of the optical communication system 200. As shown in FIG. 3B, the laser diodes 302, 302a-d are shared among (i.e., jointly pump) the fiber pairs 422, 422a/b, where a number of laser diodes 302, 302a-d is greater than a number of fiber pairs 422, 422a/b.

Cable Type

Figures 4A, 4B:
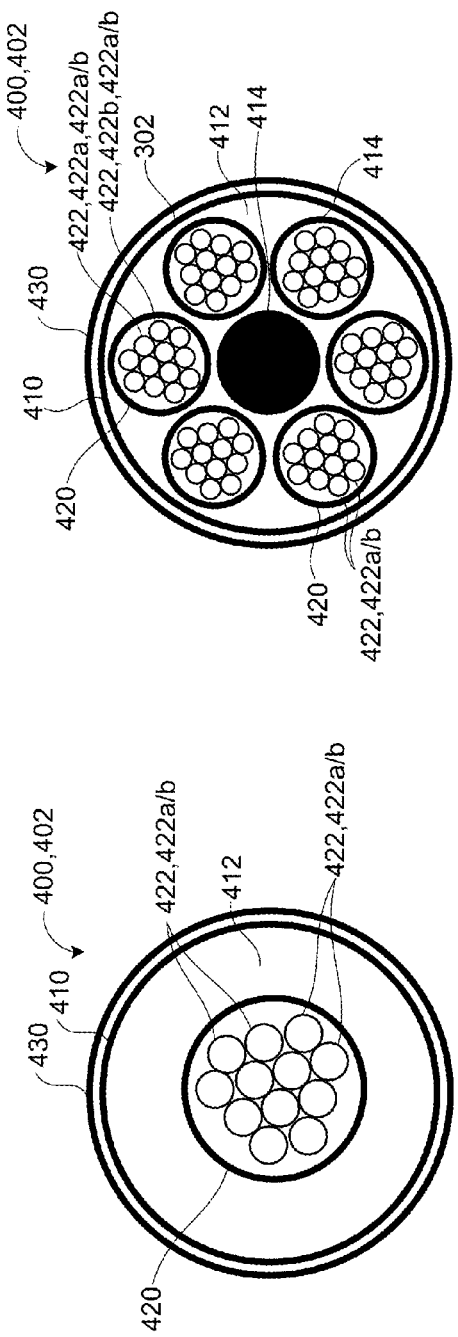
FIG. 4A is a schematic view of a cross-section of an example optical fiber cable having one group of fiber pairs.
FIG. 4B is a schematic view of a cross-section of an exemplary optical fiber cable having multiple groups of fiber pairs.

The communication trunk 400 may be any type of trunk configured to transmit optical fibers 422. FIGS. 4A and 4B illustrate exemplary communication trunks 400 that may be used. Other types and configurations of communication trunks 400 may be used as well. In addition, since each repeater 230 is powered from a PFE 212 located at the trunk terminal 210, the communication trunk 400 should be configured to carry electrical power from the PFE 212 to power the repeaters 230. As an optical signal 266 becomes weak after transmission through the communication trunk 400, every 40, 60, or 80 kilometers, depending on the design and architecture of the optical communication system 200, the signal 266 needs to be amplified by the repeater 230.

With continued reference to FIGS. 4A and 4B, in some examples, each communication cable trunk 400 includes an outer tube 410. In some examples, the outer tube 410 is filled with water-blocking gel 412 to protect the optical fiber 422 from water and damage caused by the subsea elements. The communication trunk 400 may include a strengthening member 414, positioned for example at the center of the outer tube 410 as shown in FIG. 4B. At least one inner tube 420 is positioned within the outer tube 410. Each inner tube 420 includes fibers 422 (e.g., usually 6-12 cables, where each two fibers 422 form a fiber pair 422a/b. In some examples, a copper tube 430 wraps around the outer tube 410 and acts as an electrical conductor that transmits electrical power from the stations 210 to the repeaters 230. Electrical conductivity is a measure of how well a material transports an electrical charge, which is an essential property in electrical wiring systems. Copper has the highest electrical conductivity rating of all the non-precious metals. As such, copper is often used in the design of optical communication systems 200. However, the optical communication system 200 may use other materials to replace the copper tube 430. The other material may be aluminum or carbon, each having a lower conductivity than copper, which results in a cheaper overall system cost. In addition, based on the length requirement of the cables and the power requirements, in some examples, some cable trunks 402 do not need very high conductivity and therefore lighter material that is usually cheaper than copper may be used.

Referring to FIGS. 4C-4F, the fiber 422 may be any type of fiber 422 configured to optically transmit a communication signal 266. Each fiber cable 422 has at least one fiber core 424. FIG. 4C is a schematic view of a cross-section of an exemplary single-mode single-core optical fiber. A single-mode fiber is an optical fiber designed to carry light only directly down the fiber—the transverse mode. The single-mode fiber allows for communications 266 traveling at different frequencies, but at the same mode. As such, the single-mode fiber shown in FIG. 4C allows an optical communication to travel within its core in one direction. FIG. 4D is a schematic view of a cross-section of an exemplary multi-mode single-core optical fiber. Multi-mode optical fiber is a type of optical fiber that has a larger core than the single-mode fiber, which allows for a higher "light-gathering" capacity. In other words, the larger size of the core 424 simplifies connections and allows the system 200 to use lower-cost electronics at the trunk terminals 110. FIG. 4E is a schematic view of a cross-section of an exemplary single-mode multi-core optical fiber. In this case, the fiber 422 includes multiple cores 424, where each core 424 is a single mode. Finally, FIG. 4F is a schematic view of a cross-section of an exemplary multi-mode multi-core optical fiber, where the fiber 422 includes multiple cores having a core diameter being larger than the core diameter of a single mode multi fiber core as shown in FIG. 4E.

Switch

The switch 232 associated with each repeater 230 is located and configured based on an exact fiber cut risk and target availability in addition to a type of communication trunk 400 and fibers 422 (see FIGS. 4A-4F). As such, the use of switches 232 increases the overall end-to-end availability of the communication network 220 for the same segment level availability because the switches 232 allow for network flexibility when transmitting a communication signal 266 between two trunk terminals 210. In some examples, each switch 232 is used at the optical fiber 422 level, or at the wavelength level 266, λ. Additionally, each switch may be manually activated or automatically activated. A manual activation of the switch 232 may be, for example, when a trunk 400, or trunk link 402, or fiber 422 has a fault, therefore the switch is manually activated to route a communication to a different one of the trunk 400, or trunk link 402, or fiber 422 that has the fault. An automatic activation of the switch 232 occurs when the trunk terminal 110, for example, identifies the path or the communication trunks 402 or specific fibers 422 that a communication signal should take to reach its destination.

In some implementations, the switch 232 is configured to have multiple granularities. For example, the switch may be configured to switch the signals at a cable level. In other words, the switch 232 switches the signal from a first cable trunk to a different cable trunk. The switch 232 may also be configured to switch the signals 266 from a first cable pair to a second cable pair 422, 422a/b.

Figure 5A:
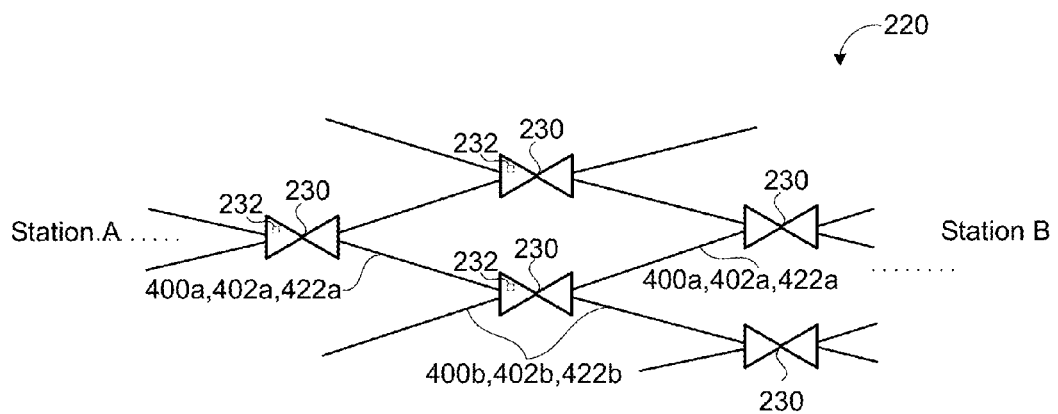
FIGS. 5A-5D are schematic views of example communication networks of an optical communication system.

FIGS. 5A-5D illustrate the multiple granularity levels of switching that the switch 232 may implement within the communication network 220. FIG. 5A illustrates a subsea network 220 using the repeaters 230 that include the network switches 232. As shown, the trunks 400 from station A 210a transmit and receive communications to and from station B 210b. As such, the network 220 includes multiple repeaters 230 that include switches 232 to switch the communication signal 266 from a first trunk 400a to a second trunk 400b or from a first trunk link 402a to a second trunk link 402b or from a first fiber 422a to a second fiber 422b.

Figure 5B:
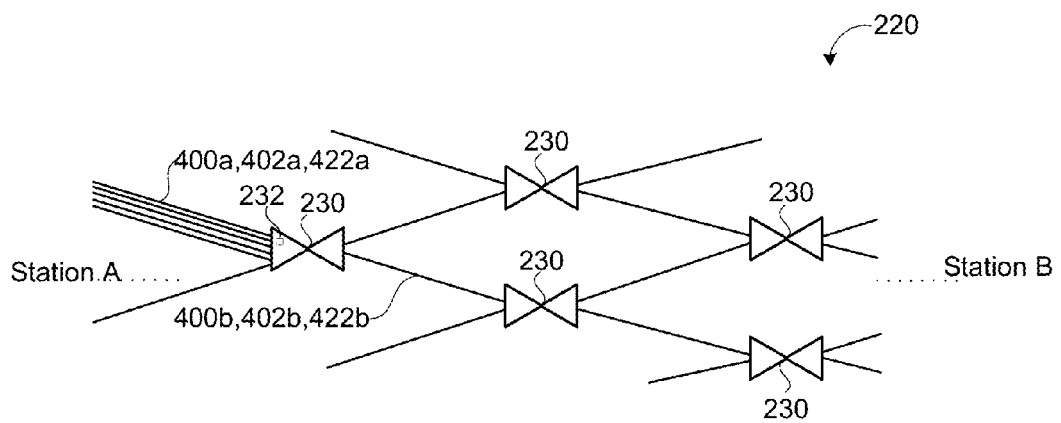

Referring to FIG. 5B, in some implementations, the communication trunk 400 from a first station 110a includes multiple fibers 422, where each fiber 422 has a multi-core (e.g., FIGS. 4E and 4F). In this case, the switch 232 receiving the communications 266 from the multi-core optical fibers 422 of the communication trunk 400 to another direction. As such, the switch 232 implements space division multiplexing that directs the mode from the multi-core optical fibers 422 to a different fiber 422.

Figure 5C:
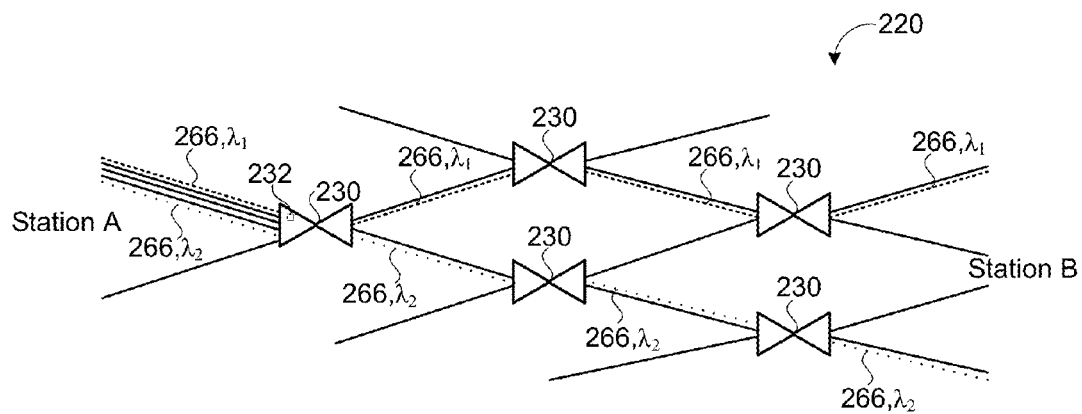
Figure 5D:
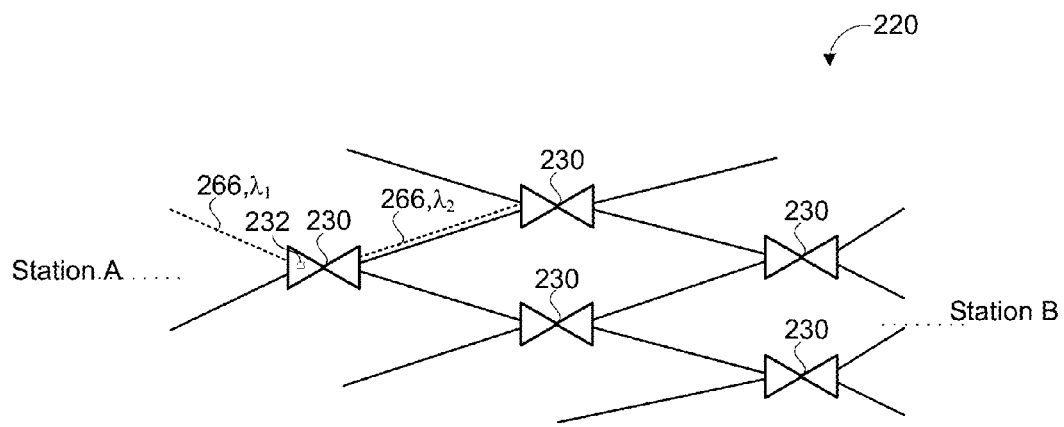

Referring to FIG. 5C, in some implementations, the switch 232 implements frequency division. In this case, the switch 232 directs communications 266 having a first frequency $\lambda_1$ in a direction different from a communication 266 having a second frequency $\lambda_2$, where both communications travel to the switch 232 within the same fiber 422. Referring to FIG. 5D, in some implementations, the switch 232 receives a communication that has a first frequency $\lambda_1$ and changes the first frequency $\lambda_1$ of the communication to a second frequency $\lambda_2$ different from the first frequency $\lambda_1$. Referring back to FIGS. 5A-5D, the communication network 220, more specifically the switches 232 of each repeater 230 are configured to adapt to multiple levels of switching granularity, for example, at a trunk level as shown in FIG. 5A, at a fiber pair level or fiber level as shown in FIG. 5B, at a core level as shown in FIG. 5C, and at a wavelength or frequency level as shown in FIG. 5D.

Figure 6:
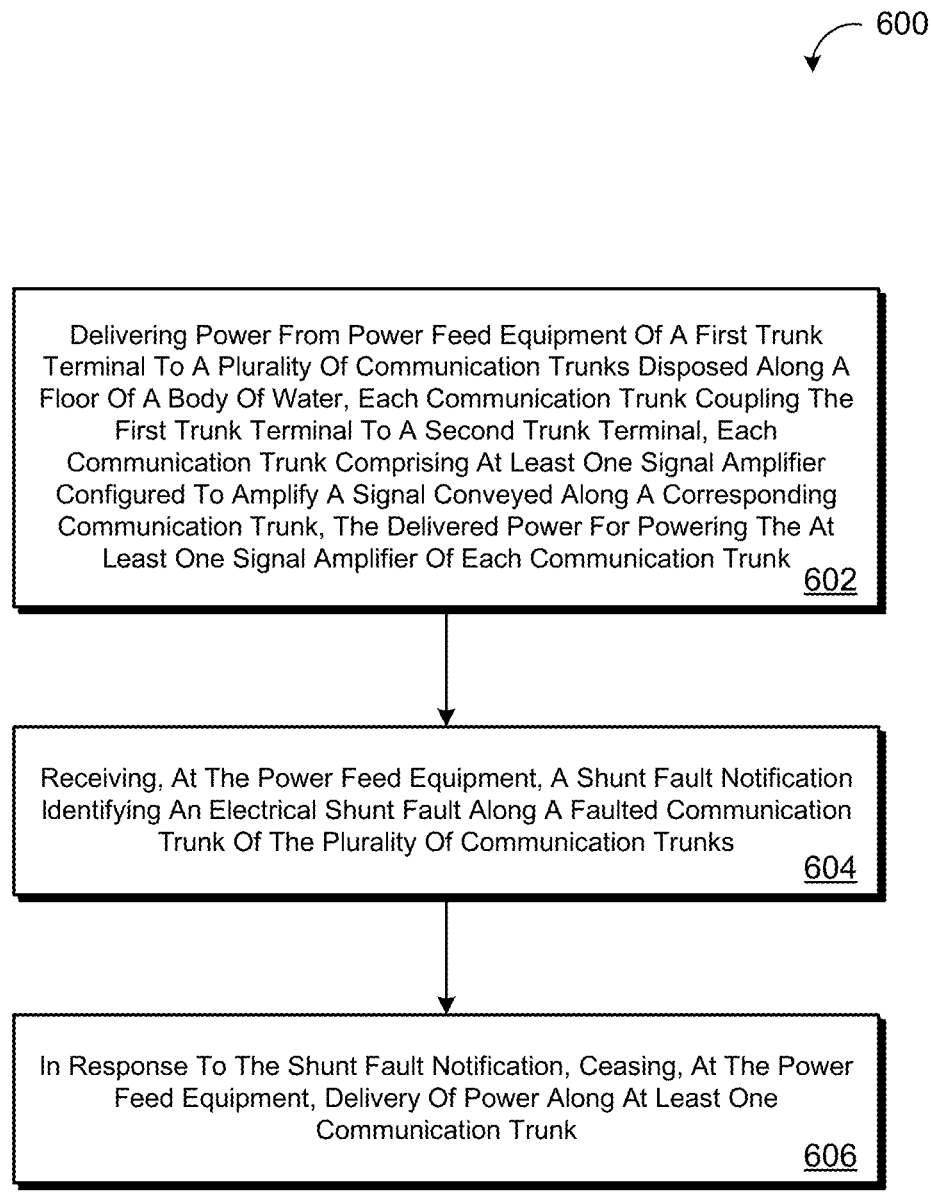
FIG. 6 is a flowchart providing an example arrangement of operations for a method of optical communication via an optical communication network.

FIG. 6 illustrates a method 600 of optical communication via a communication system 200 having a communication network 220 as described with respect to FIGS. 2A-5D. At block 602, the method 600 includes delivering power from power feed equipment (PFE) 212 of a first trunk terminal 110a to a plurality of communication trunks 400, 402 disposed along a floor of a body of water. At block 604, the method 600 includes receiving, at the PFE 212, a shunt fault notification 214 identifying an electrical shunt fault along a faulted communication trunk 400, 402 of the plurality of communication trunks 400, 402. At block 606, in response to the shunt fault notification 214, the method 600 includes ceasing, at the PFE 212, delivery of power along at least one communication trunk 400, 402. Each communication trunk 400, 402 couples the first trunk terminal 110a to a second trunk terminal 110b. In addition, each communication trunk 400, 402 includes at least one signal amplifier 300 configured to amplify a signal 266 conveyed along a corresponding communication trunk 400, 402, the delivered power powers the at least one signal amplifier 300 of each communication trunk 400, 402.

In some implementations, each communication trunk 400, 402 has an availability level. In response to the shunt fault notification 214, the method 600 may include ceasing, at the power feed equipment 212, delivery of power to any communication trunks 400, 402 having a corresponding availability level dissatisfying a threshold availability level. Each communication trunk 400, 402 may have a low-availability by having a communication delivery success rate of less than 99.9 percent. Communication switches may interconnect two or more of the plurality of communication trunks 400, 402 forming a communication trunk network 220 disposed along the floor of the body of water and coupling the first trunk terminal 110a to the second trunk terminal 110b. In some examples, the method 600 includes receiving, at a backup signal amplifier 300 (i.e., a backup laser pump 302b) coupled to each communication cable, a failure notification 214 indicating failure of a main signal amplifier 300 (i.e., a main laser pump 302a) to amplify a signal 266 of a communication cable 402 of the plurality of communication trunks 400, 402. In response to receiving the failure notification, the method 600 may include amplifying at the backup amplifier 300 (i.e., a backup laser pump 302b), the signal 266 conveyed along a corresponding communication cable 402 associated with the main signal amplifier 300. Each communication cable 402 may include a fiber optic cable 422 having a low-availability by having a communication delivery success rate of less than 99.9 percent (or three nines). Each communication trunk 400 may include a plurality of optical fibers 422 and an electrical conductor 430. The electrical conductor 430 may include at least one of copper or aluminum.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of implementations have been described. Nevertheless, it will be understood that various modifications may be made without departing from the spirit and scope of the disclosure. Accordingly, other implementations are within the scope of the following claims.

What is claimed is:

1. A communication system comprising:
a first trunk terminal;
a second trunk terminal;
a plurality of communication trunks disposed along a floor of a body of water, each communication trunk coupling the first trunk terminal to the second trunk terminal, each communication trunk comprising at least one signal amplifier configured to amplify a signal conveyed along a corresponding communication trunk; and
power feed equipment coupled to the plurality of communication trunks, the power feed equipment configured to:
deliver power along each communication trunk to power at least one signal amplifier of the communication trunk;
receive a fault notification identifying a cable cut fault or an electrical shunt fault along a faulted communication trunk of the plurality of communication trunks;
in response to the fault notification identifying the cable cut fault, route traffic from the faulted communication trunk to at least one non-faulted communication trunk; and
in response to the fault notification identifying the electrical shunt fault, ceasing deliver of power along at least one communication trunk.

2. The communication system of claim 1, wherein each one of the first and second trunk terminals includes a software-defined networking controller configured to reroute traffic from the faulted communication trunk to the at least one non-faulted communication trunk.

3. The communication system of claim 1, wherein each communication trunk has an availability level, and in response to the fault notification, the power feed equipment ceases delivery of power to any communication trunks having a corresponding availability level dissatisfying a threshold availability level.

4. The communication system of claim 1, wherein each communication trunk has low-availability by having a communication delivery success rate of less than 99.9 percent.

5. The communication system of claim 1, further comprising a communication trunk network disposed along the floor of the body of water and coupling the first trunk terminal to the second trunk terminal, the communication trunk network comprising:
the plurality of communication trunks; and
communication switches interconnecting two or more of the plurality of communication trunks.

6. The communication system of claim 1, further comprising an intermediate unit connected to one or more communication trunks between the first and second trunk terminals, the one or more communication trunks comprising a plurality of communication cables, the intermediate unit comprising:
a group of main signal amplifiers, each main signal amplifier coupled to a corresponding communication cable of the communication trunk and configured to amplify a signal of the corresponding communication cable; and
a backup signal amplifier coupled to two or more communication cables and configured to:
receive a failure notification indicating failure of one of the main signal amplifiers of the group of signal amplifiers; and
in response to receiving the failure notification, amplify the signal conveyed along the corresponding communication cable.

7. The communication system of claim 4, wherein each communication cable comprises a fiber optic cable having a low-availability by having a communication delivery success rate of less than 99.9 percent.

8. The communication system of claim 1, wherein each communication trunk comprises:
a plurality of optical fibers; and
an electrical conductor.

9. The communication system of claim 8, wherein the electrical conductor comprises at least one of copper or aluminum.

10. A method comprising:
delivering power from power feed equipment of a first trunk terminal to a plurality of communication trunks disposed along a floor of a body of water, each communication trunk coupling the first trunk terminal to a second trunk terminal, each communication trunk comprising at least one signal amplifier configured to amplify a signal conveyed along a corresponding communication trunk, the delivered power for powering the at least one signal amplifier of each communication trunk;
receiving, at the power feed equipment, a shunt fault notification identifying an electrical shunt fault along a faulted communication trunk of the plurality of communication trunks; and
in response to the shunt fault notification, ceasing, at the power feed equipment, delivery of power along at least one communication trunk.

11. The method of claim 10, wherein each communication trunk has an availability level, and in response to the shunt fault notification, ceasing, at the power feed equipment, delivery of power to any communication trunks having a corresponding availability level dissatisfying a threshold availability level.

12. The method of claim 10, wherein each communication trunk has low-availability by having a communication delivery success rate of less than 99.9 percent.

13. The method of claim 10, wherein communication switches interconnect two or more of the plurality of communication trunks forming a communication trunk network disposed along the floor of the body of water and coupling the first trunk terminal to the second trunk terminal.

14. The method of claim 10, further comprising:
receiving, at a backup signal amplifier coupled to two or more of the communication cables, a failure notification indicating failure of a main signal amplifier to amplify a signal of a communication cable of the plurality of communication trunks; and
in response to receiving the failure notification, amplifying at the backup amplifier, the signal conveyed along a corresponding communication cable associated with the main signal amplifier.

15. The method of claim 14, wherein each communication cable comprises a fiber optic cable having a low-availability by having a communication delivery success rate of less than 99.9 percent.

16. The method of claim 10, wherein each communication trunk comprises:
a plurality of optical fibers; and
an electrical conductor.

17. The method of claim 16, wherein the electrical conductor comprises at least one of copper or aluminum.

18. A communication system comprising:
a first trunk terminal;
a second trunk terminal;
at least one communication trunk disposed along a floor of a body of water and coupling the first trunk terminal to the second trunk terminal, the at least one communication trunk comprising multiple communication cables; and
an intermediate unit connected to the at least one communication trunk between the first and second trunk terminals, the intermediate unit comprising:
a group of main signal amplifiers, each main signal amplifier coupled to a corresponding communication cable and configured to amplify a signal conveyed along the corresponding communication cable; and
a single backup signal amplifier coupled to two or more of the communication cables and configured to:
receive a failure notification indicating a failure of one of the main signal amplifiers; and
in response to receiving the failure notification, amplify the signal conveyed along the communication cable corresponding to the failed main signal amplifier.

19. The communication system of claim 18, further comprising a communication trunk network disposed along the floor of the body of water and coupling the first trunk terminal to the second trunk terminal, the communication trunk network comprising:
the multiple communication cables; and
communication switches interconnecting two or more of the multiple communication cables.

20. The communication system of claim 18, further comprising a communication trunk network disposed along the floor of the body of water and coupling the first trunk terminal to the second trunk terminal, the communication trunk network comprising:
communication trunks; and
communication switches interconnecting the communication trunks.

21. The communication system of claim 18, wherein each communication trunk comprises:
a plurality of optical fibers; and
an electrical conductor.

22. The communication system of claim 21, wherein the electrical conductor comprises at least one of copper or aluminum.

23. A communication system comprising:
a first trunk terminal;
a second trunk terminal;
a communication trunk network disposed along a floor of a body of water and coupling the first trunk terminal to the second trunk terminal, the communication trunk network comprising:
communication trunks;
communication switches interconnecting the communication trunks; and
an intermediate unit connected to each communication trunk between the first and second trunk terminals, each communication trunk comprising a plurality of communication cables, the intermediate unit comprising:
a group of main signal amplifiers, each main signal amplifier coupled to a corresponding communication cable of the corresponding communication trunk and configured to amplify a signal of the corresponding communication cable; and
a backup signal amplifier coupled to two or more of the communication cables and of the corresponding communication trunk configured to:
receive a failure notification indicating failure of one of the main signal amplifiers; and
in response to receiving the failure notification, amplify the signal conveyed along the communication cable corresponding to the failed main signal amplifier; and
power feed equipment coupled to the communication trunk network, the power feed equipment configured to:
deliver power along each communication trunk to power the corresponding intermediate unit and/or the switches;
receive a shunt fault notification identifying an electrical shunt fault along a faulted communication trunk of the communication trunks; and
in response to the shunt fault notification, cease delivery of power along at least one communication trunk.

24. The communication system of claim 23, wherein each communication trunk comprises an electrical conductor in electrical communication with the power feed equipment.

25. The communication system of claim 24, wherein the electrical conductor comprises at least one of copper or aluminum.

26. A communication system comprising:
a first trunk terminal;
a second trunk terminal;
a communication trunk network including first and second communication trunks disposed along a floor of a body of water and coupling the first trunk terminal to the second trunk terminal, each communication trunk including fiber pairs, the communication trunk network comprising:
repeaters disposed on the first and second communication trunks;
a first power cable extending from the first trunk terminal to the second trunk terminal and configured to power the repeaters associated with the first communication trunk; and
a second power cable extending from the first trunk terminal to the second trunk terminal and configured to power the repeaters associated with the second communication trunk; and a controller configured to control power delivery to the communication network by:

identifying one or more repeaters to be unpowered by the corresponding one or more power cables;

bypassing the powering of the one or more identified repeaters;

receiving a fault notification identifying a fault communication trunk of the first and second communication trunks; and in response to receiving the fault notification:

reassessing the identification of the one or more repeaters to be unpowered by the corresponding one or more power cables; and bypassing the powering of the one or more reassessed-identified repeaters.

27. The communication system of claim 26, wherein the communication trunk network further comprises a network switch, the network switch having a first connector connecting the first and second communication trunks and a second connector connecting the first and second power cables.

28. The communication system of claim 27, wherein the fault notification identifies a cable cut fault or an electrical shunt fault along the faulted communication trunk, and the controller is further configured to:

in response to the fault notification identifying the cable cut fault, route traffic from the faulted communication trunk to a non-faulted communication trunk; and in response to the fault notification identifying the electrical shunt fault, ceasing deliver of power along at least one communication trunk.

29. The communication system of claim 26, wherein the controller comprises a first software-defined networking controller located at the first trunk terminal and a second software-defined networking controller located at the second trunk terminal.

* * * * *